March 13, 1956 — N. WATSON — 2,737,861
NEST SET-UP MACHINE
Filed June 14, 1952 — 10 Sheets-Sheet 1

Inventor
Nathan Watson
By Soans Glaister & Anderson
Attorneys

March 13, 1956  N. WATSON  2,737,861
NEST SET-UP MACHINE
Filed June 14, 1952  10 Sheets-Sheet 10

Inventor
Nathan Watson
By Soans Glaister & Anderson
Attorneys

United States Patent Office 2,737,861
Patented Mar. 13, 1956

2,737,861

NEST SET-UP MACHINE

Nathan Watson, Sioux City, Iowa, assignor to United Biscuit Company of America, Chicago, Ill., a corporation of Delaware Application June 14, 1952, Serial No. 293,621

11 Claims. (Cl. 93—37)

This invention relates to an improvement in apparatus for forming a pre-cut paperboard blank into a container partitioning tray or nest for use in packaging bakery goods, confections and the like in a bag or box.

The main objects of the present invention are to provide apparatus for automatically folding pre-cut paperboard blanks into nests or trays at a high speed; to provide apparatus of the character indicated which will be compact and of relatively small over-all size; to provide such apparatus which will be highly efficient and durable so as to be operative for extended periods of time with but little maintenance attention; and to provide apparatus of the character indicated which will be low in cost of construction and low in operating power requirements.

Other objects and advantages of the invention will be understood by reference to the following specification and accompanying drawings wherein there is illustrated a machine embodying a selected form of the invention.

In the drawings, of which there are ten (10) sheets, the figures are as follows.

Figures 20, 21, 22:
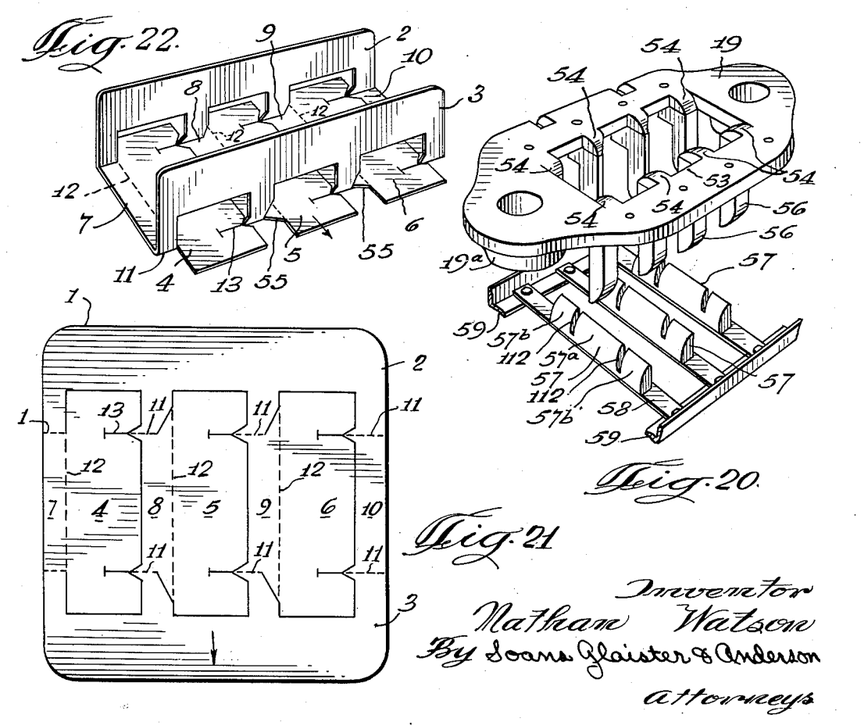
Figure 20 is a perspective illustration of certain components of the machine.
Figure 21 is a plan view of one of the blanks which is formed into a tray by the machine.
Figure 22 illustrates one step in the forming of the blank into the tray.
Figures 23, 24:
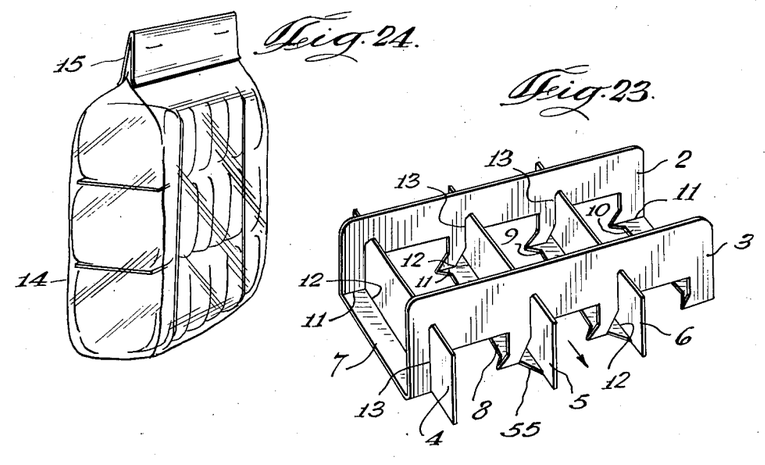
Figure 23 illustrates the completed tray or nest.
Figure 24 is a perspective illustration of one method in which the tray is used for packaging purposes.

The machine shown in this application is designed to fold blanks such as shown in Figure 21 from flat condition as there illustrated to the tray form shown in Figure 23, the blank being provided with suitably formed fold lines and slitting to permit it to be so folded. As shown in Figure 23 the set-up tray comprises side walls 2 and 3, transverse partitions 4, 5 and 6 and bottom straps or ledges 7, 8, 9 and 10. The machine shown in the drawings folds the blank 1 (Figure 21) by first gripping the bottom portions 7, 8, 9 and 10 between upper and lower plungers or grippers which carry the blank downwardly through a die structure which first folds the side walls 2 and 3 upwardly on short aligned fold lines 11, and thereafter folds the transverse partitions 4, 5 and 6 upwardly about the fold lines 12. Figure 22 represents an intermediate stage in which the side walls 2 and 3 are folded upwardly on the said fold lines 11, this being a condition which exists just before the transverse partitions 4, 5 and 6 are folded upwardly about the fold lines 12. Each of the partitions 4, 5 and 6 have slits 13 which receive portions of the side walls 2 and 3 so that the partitions thereby become frictionally locked in set-up position as shown in Figure 23, the side walls being also thereby positively locked in their upstanding positions.

As shown in Figure 23 the tray provides receptacles intermediate and outwardly of the side walls 2 and 3 and between the portions 4, 5 and 6, into which receptacles cookies or other products may be packed in a regular or uniform arrangement as indicated in Figure 24, the filled tray being there shown enclosed in a suitable bag 14 which may be of transparent or other material and closed in any acceptable manner such as indicated at 15. This tray may of course be placed in a box instead of a bag or it may be wrapped in any other desired manner.

Figures 1, 2:
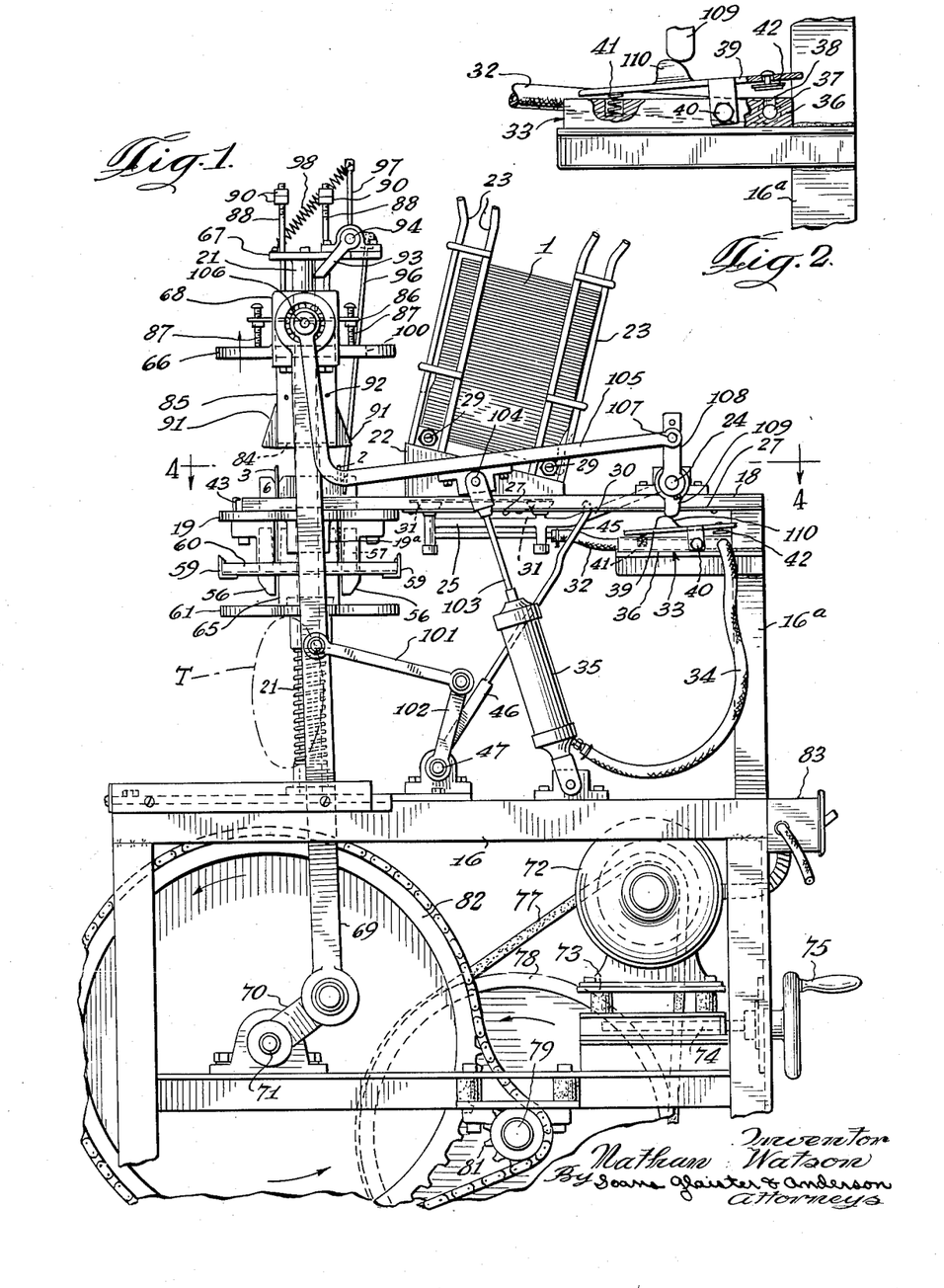
Figure 1 is a side elevation.
Figure 2 is an enlargement of a part of Figure 1 to illustrate certain details of construction.
Figure 3:
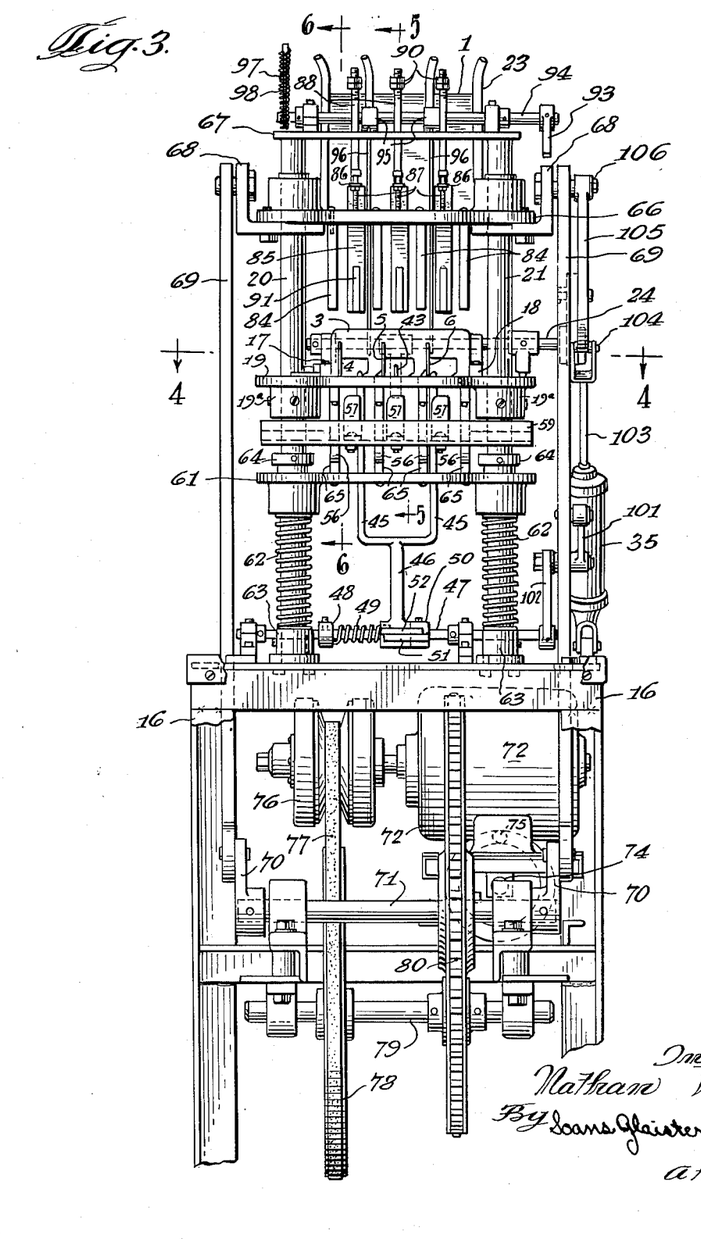
Figure 3 is an end elevation looking at the lefthand side of Figure 1 certain vertically reciprocable parts being shown in Figure 3 in a slightly lower position than in Figure 1.
Figure 4:
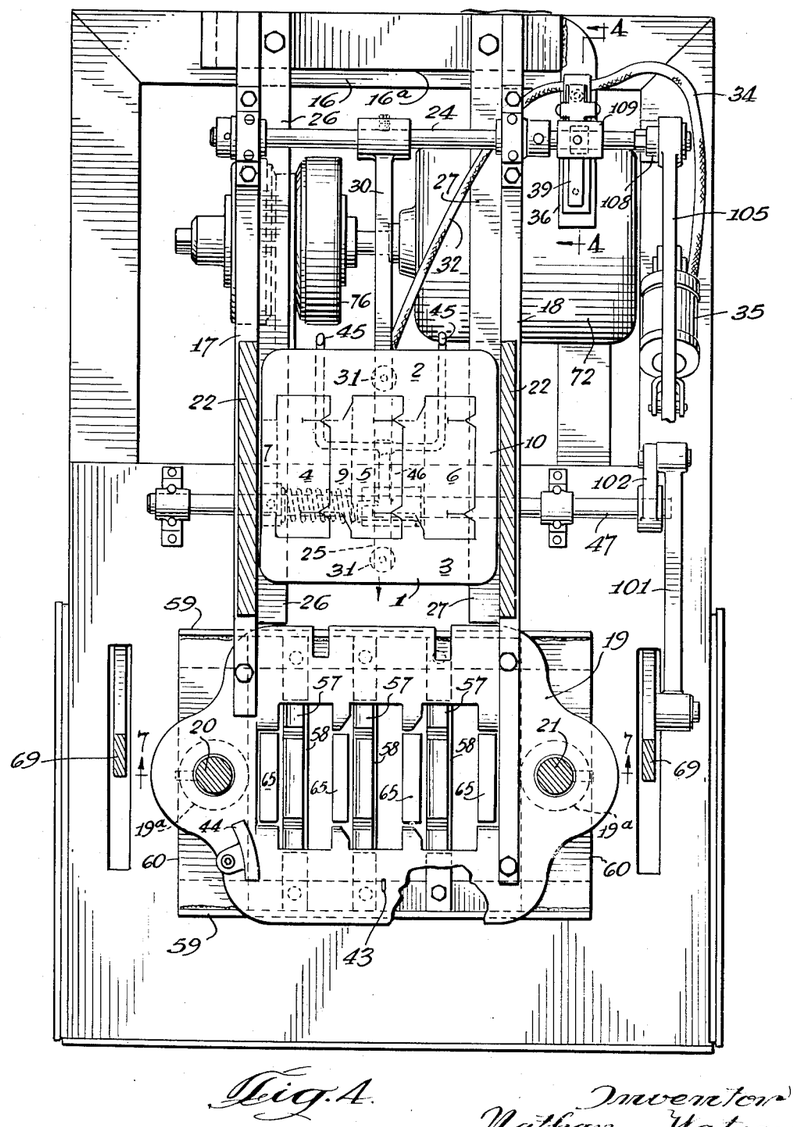
Figure 4 is a plan section on the line 4—4 of Figures 1 and 3.

The apparatus embodies a main frame structure 16 which includes an upstanding portion 16a at one end for supporting one end of each of a pair of horizontally extending guide rails 17 and 18 (Figures 1 and 4). At their opposite ends, these guide rails 17 and 18 are supported by a die plate 19 which is fixedly secured to a pair of upstanding shafts or rods 20 and 21. These rods 20 and 21 extend upwardly from another portion of the frame structure 16 as shown in Figure 3.

A suitable magazine for holding a supply of the blanks 1 is supported on said guide rails 17 and 18, this magazine structure including bottom side plates 22 which extend upwardly from the guide rails 17 and 18 and from which a suitable skeleton frame structure 23 extends upwardly to hold the supply of blanks 1. The magazine side plates 22 at the bottom of the magazine are of generally wedge-shape as indicated so that the magazine structure 23 is supported at an inclined angle which will place the plane of the lowermost blank in the magazine approximately in alignment with a radius of a pivot shaft 24 which is the axis about which a vacuum picker 25 rocks for withdrawing blanks from the bottom of the magazine and delivering them to ledges or flanges 26 and 27 which extend toward each other from the respective guide rails 17 and 18.

Said magazine 23 embodies a lower frame element 28 (Figure 9) which is provided near each corner of the magazine with a conically pointed blank supporting screw 29 which is adapted to support the blanks in the magazine while at the same time permitting the lowermost blank to be forced past the supporting points 29 when pulled downwardly by the picker 25.

Said picker 25 comprises a suitable arm structure 30 which is secured to the rock shaft or pivot shaft 24 (Figures 1 and 4) and which arm 30 supports a pair of vacuum cups 31, 31 which communicate by means of a flexible hose 32 with one side of a valve structure 33 which is connected by another flexible hose 34 to a vacuum pump 35.

The valve structure 33 comprises a main body part 36 (Figure 2) which has a passageway 37 extending therethrough and which communicates at its opposite ends with the hoses 32 and 34. A bleeder or vent opening 38 extends laterally from an intermediate portion of the passageway 37 and communicates with the atmosphere at the top of said main body 36. A valve plate 39 is pivoted as indicated at 40 on the sides of the main body 36 and is normally urged by a spring 41 to rock so that a disc 42 freely suspended from the opposite end of said plate 39 will rest on the main body 36 over the end of the opening 38 to close the same. The disc 42 is of a suitable soft material which will seat tightly on the valve body 36 around the opening 38 and it is freely suspended from the plate 39 so that when the pump is actuated in one direction so as to force air out of the lower end of the pump and through the hose 34, said closure disc 41 may be unseated by the force of the air to permit the escape of such compressed air, thereby to prevent a strong air current from being discharged out of the vacuum cups 31. However, when the pump is operated to create suction in the hose line 34, said valve disc 41 will be sucked down into tight engagement with the top of the valve body 36 around said opening 38 to thereby seal said opening and thereby cause the suction to be transmitted through the hose 32 to the vacuum cups 31. When the vacuum cups 31 are moved downwardly to deliver a blank 1 from the magazine 23 to the said flanges 26 and 27, vacuum will of course be maintained in said cups until they reach nearly their lowermost position or until they reach the position in which the blanks come into engagement with the flanges 26 and 27. At that time the vacuum will be released or relieved by rocking the valve plate 39 to the position in which it is shown in Figure 2 so that air may enter said opening 38 and thus relieve the said vacuum in the vacuum cups. In this manner the blanks 1 will be successively delivered to the ledges 26 and 27 between the guide rails 17 and 18. The means for rocking the picker 25 up and down and for actuating the valve plate 39 will presently be explained.

A blank 1 delivered to the ledges 26 and 27 will next be moved edgewise along said ledges and between the guide rails 17 and 18 to a position over the die plate 19. This position will be in part determined by a stop pin 43 which projects upwardly from the die plate 19 (Figures 4 and 8) and in part by an adjustable guide element 44 which is designed to be so set that it will more or less cam the incoming blank 1 edgewise into engagement with the opposite guide rail 18. It will be observed that the guide rail 18 extends substantially all the way across the die plate 19 whereas the guide rail 17 terminates in spaced relation to the adjustable guide element 44.

The movement of the blanks 1 from the position shown in full lines in Figure 4 on the ledges 26 and 27 to position over the die plate 19 is effected by means of a pair of feed arms 45, 45 (Figures 3 and 4) which are carried by a rock arm 46 which is pivotally mounted on a rock shaft 47. This rock shaft 47 is journalled in suitable bearings carried by the frame structure 16 and it carries a collar 48 which is secured to the shaft in fixed relation thereto. This collar 48 is connected by a suitable coil spring 49 to the hub of the arm 46 by which said arm is pivotally mounted on the shaft 47 so that when the shaft 47 is rocked in the direction for shifting the feeding fingers 45 to advance a blank to the die 19, the rocking movement is imparted from the shaft 47 through the spring 49 to said feeding arm 46. This yieldable feed arrangement avoids injury to the machine is case a blank should be jammed and normal feed movement of the feeder arm 46 prevented. The normal position of the arm 46 with reference to the shaft 47 is determined by another collar 50 which is fastened to said shaft 47 and which collar is provided with a laterally extending flange or stop ledge 51 which is engaged by a similar stop flange or ledge 52 which projects from the hub of the feed arm 46. The spring 49 normally urges the arm 46 to rock in feeding direction about the shaft 47 so that the ledge 52 is maintained in engagement with the ledge 51. Hence, the spring 49 can rock the feeding finger 46 only to the extent that the shaft 47 and the ledge or stop 51 are rocked in the direction to permit such feeding. Means for rocking the shaft 47 will presently be set forth. Return movement of the feed arms is positively effected incident to the interengagement of the lugs or ears 51 and 52.

The die plate 19 is provided with a pair of depending bosses 19a (Figure 7) which are bored out and preferably bushed to snugly fit the supporting posts 20 and 21 to which said plate 19 is secured in fixed position by means of set screws as shown. This die plate 19 has an opening 53 (Figure 20) through which the blanks are forced and suitable folding fingers 54 project into said opening from the opposite side edges thereof. When the blank is forced downwardly through said die opening 53, the fingers 54 engage the sides 2 and 3 of the blank at the spaced portions which connect the respective sides with the bottom elements 7, 8, 9 and 10. It will be observed that the two intermediate folding fingers 54 on each side of the die opening 53 have bevelled side faces to conform or fit the angular edges 55 (Figure 22) of the bottom elements 8 and 9. These folding fingers 54 are, in effect, extended downwardly from the die plate by means of depending fingers or arms 56 which serve during the downward movement of the blank through the die to hold said side walls 2 and 3 in their upwardly folded position while a male die effects upward folding of the partition elements 4, 5 and 6.

Figure 7:
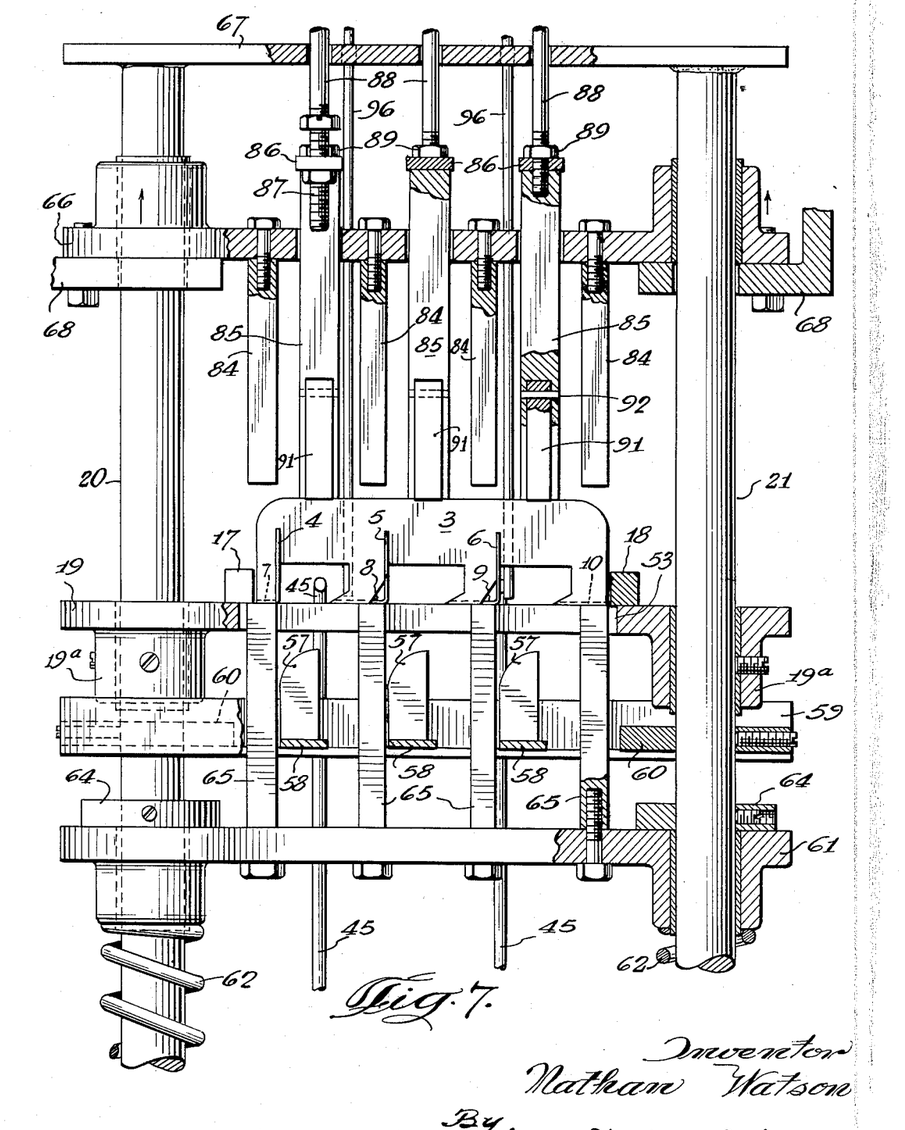
Figure 7 is a section on the line 7—7 of Figure 4.

The male die which effects upward folding of the transverse partitions 4, 5 and 6 comprises upwardly projecting folders 57 which are supported by cross bars 58 which are in turn supported by angle iron frame elements 59, the latter being connected at their ends by means of end bars 60 (see also Figure 7). The end bars 60 are apertured to fit on the respective posts 20 and 21 and set screws are provided for locking this upwardly projecting male die structure in fixed position on the posts and in fixed relation to the female die plate 19.

Below the die frame 59, 60 there is vertically slidably mounted on the posts 20 and 21 a plate 61, (Figures 3 and 7) this plate being supported in normally elevated position by coil springs 62 disposed about the posts 20 and 21 intermediate bosses which depend from said plate 61 and upwardly facing members 63 by means of which the posts are mounted on the frame structure 16. Collars 64 are also mounted on the posts 20 and 21 above the said plate 61, these collars being secured in fixed position on the post by set screws or like means as best shown in Figure 7. These fixed collars 64 serve to limit the upward movement of the member 61 by the springs 62. A plurality of upwardly projecting blank supporting or gripping bars or plungers 65 are bolted to the slidable plate 61 and these bars have their upper ends in substantially coplanar relation to the top face of the die plate 19 when the plate 61 is in its uppermost position. These supporting bars 65 are so positioned that they will underlie the bottom straps 7, 8, 9 and 10 of the blank when the blank is in proper position for passage through the die plate.

The means for moving the blanks downwardly through the die plate 19 comprises a plate 66 which is vertically slidably mounted on the posts 20 and 21 (see Figures 3 and 7). The upper ends of the posts are rigidly interconnected by means of a cross bar 67 (Figure 3) which is welded to the ends of the posts so that the latter are held in parallel relation to insure free sliding movement of the plate 66 on said posts. This plate 66 has bolted or otherwise secured to it, angle brackets 68 and connecting rods 69 are pivotally connected at their upper ends to said brackets 68 and at their lower ends to crank arms 70. These crank arms 70 are respectively secured to the opposite ends of a crank shaft 71 which is journalled in suitable bearings mounted on the frame structure 16. The shaft 71 is driven by suitable means so that the cranks 70 will be rotated and thereby cause the plate 66 to reciprocate vertically on said posts 20 and 21.

The shaft 71 is driven by an electric motor 72 (see Figures 1 and 3), this motor being mounted on a base 73 which is horizontally slidably mounted and capable of adjustment through the agency of an adjusting screw 74 and a hand crank 75. The motor shaft is provided with an automatically variable diameter pulley 76 which drives a V-belt 77 which in turn engages a pulley 78 on a countershaft 79 which is suitably journalled in bearings carried by the frame 16. A chain 80 engages a sprocket 81 on the countershaft 79 and a sprocket 82 on the shaft 71 which carries the cranks 70. The belt and chain drives just referred to serve to drive the cranks and the speed at which they are driven may be varied within a certain range by adjusting the motor inwardly or outwardly, thereby permitting the pulley 76 to close up to increase its effective diameter or causing it to open up to reduce its effective diameter so as to correspondingly adjust the speed at which the driven shafts are rotated. The motor 72 may be manually controlled by a suitable switch 83 (Figure 1).

Referring now to Figure 7, it will be seen that the vertically reciprocable plate 66 is provided with a series of depending plunger bars 84, these bars being rigidly attached to the plate in directly opposed relation to corresponding upwardly extending plungers or bars 65 of the lower slidable plate 61. The oppositely disposed plungers and bars 84 and 65, respectively, are in such relationship to the elements of the tray blank that said pairs of members 65 and 84 will register with and engage and clamp between them, the bottom strap elements 7, 8, 9 and 10 of the blank when the upper plate 66 is moved downwardly to bring the lower ends of the plungers 84 into engagement with a blank positioned over the die plate 19.

Another series of plungers 85 is also supported by the vertically reciprocable top plate 66. These plungers 85 have cross bars 86 (Figure 5) secured to their upper ends and said cross bars have adjustable screws 87 threaded downwardly through their end portions. The lower ends of these screws rest on the top plate 66 to thereby support the plungers 85 from said top plate, these plungers being freely slidable through openings in the plate 66. These plungers 85 also have upwardly extending pairs of bolt rods 88 threaded into the respective plungers and said bolt rods with nuts 89 thereon, serve to attach the cross bars 86 to the upper ends of the plungers. The bolts 88 extend upwardly in a freely slidable manner through the fixed cross bar 67 and stop nuts 90 are provided on the upper ends of said bolts 88 to limit the downward movement of said bolts through the cross bar 67, thereby to limit downward movement of the said plungers 85 with said plate 66. At their lower ends, the plungers 85 are provided with recesses in which pawls 91 are mounted for rocking movement on pivots indicated at 92. As shown in Figures 3 and 7, the pawl equipped plungers 85 extend somewhat below the lower ends of the fixed plungers 84 (Figures 3 and 7).

Figures 8, 9:
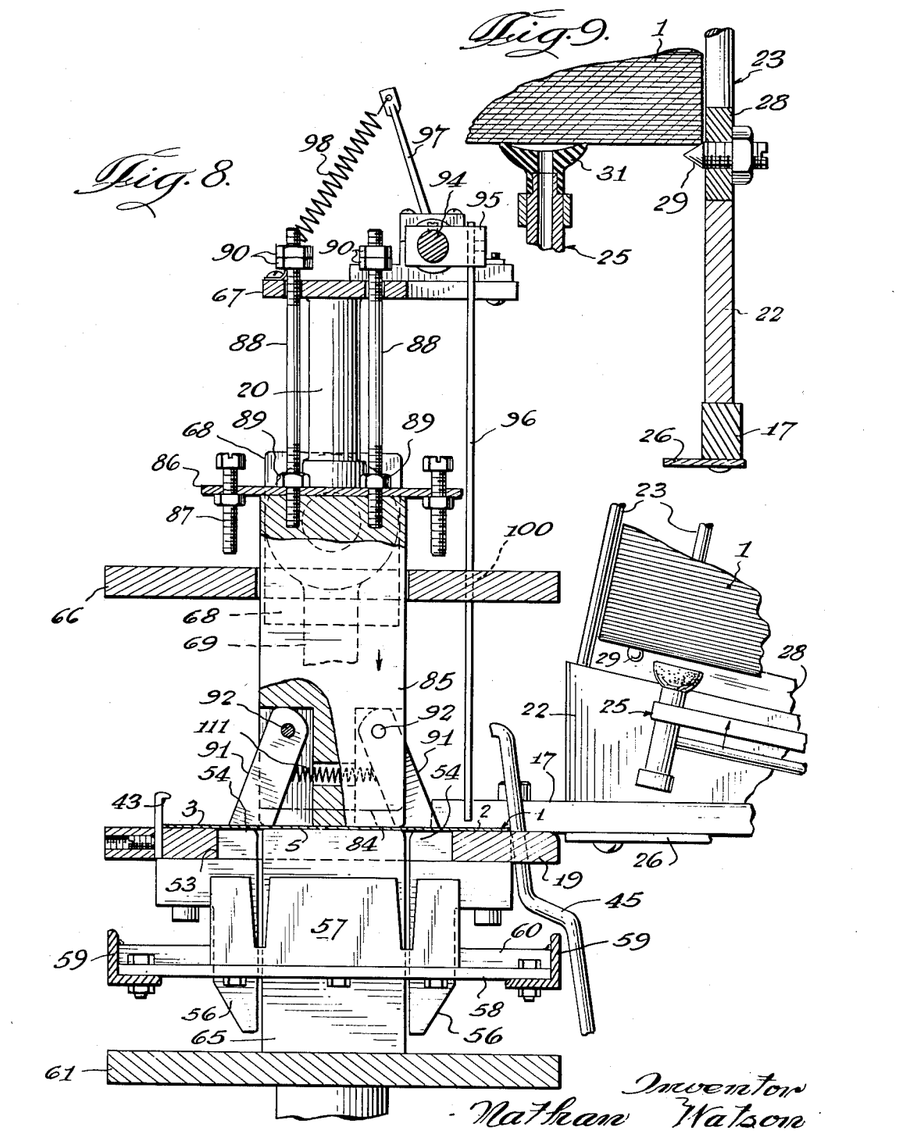
Figure 8 is a section similar to Figure 5 but showing a changed position of the parts.
Figure 9 is a detail of a portion of a blank supporting magazine and a vacuum picker which withdraws blanks one by one from the magazine.

During a terminal portion of the upward movement of the plate 66, the upper end of the bracket 68 at one side (see Figures 1 and 3), engages the free end of a lever arm 93 which is secured to one end of a rock shaft 94 which is journalled in suitable bearings on the fixed upper cross member 67. This rockably mounted shaft 94 is equipped with a pair of mounting blocks 95 (Figures 3 and 5) which carry depending ejecting bars or fingers 96. At its other end, the shaft 94 is equipped with an upwardly extending finger or lever 97 which has its free upper end connected by a suitable spring 98 to a fixed point on the cross member 67. These ejecting fingers 96 operate in suitable slots provided in the vertically reciprocable plate 66 and between adjacent plungers 84 and 85 as can be seen from an inspection of Figures 3 and 7. Incident to the terminal portion of the upward movement of the plate 66, the shaft 94 will be rocked to swing the ejecting fingers 96 to the position shown in Figure 5 and slightly farther to eject the formed tray 99. The movement imparted to the ejecting fingers 96 is a quick or fast movement which serves to throw or kick the trays 99 out of the apparatus rather than to merely slide them out. Hence, even though the fingers 96 move but slightly farther than shown in Figure 5 the momentum imparted to the trays 99 will carry them completely out of the apparatus or off the die plate 19. When the reciprocable plate 66 begins its downward movement, the arm 93 will of course be permitted to rock downwardly under the force of the spring 98 and the ejecting fingers 96 will be returned to a substantially vertical position as shown in Figure 8, this position being determined by engagement of the fingers 96 with the end wall 100 of the slot in the plate 66 in which the fingers move.

Figure 5:
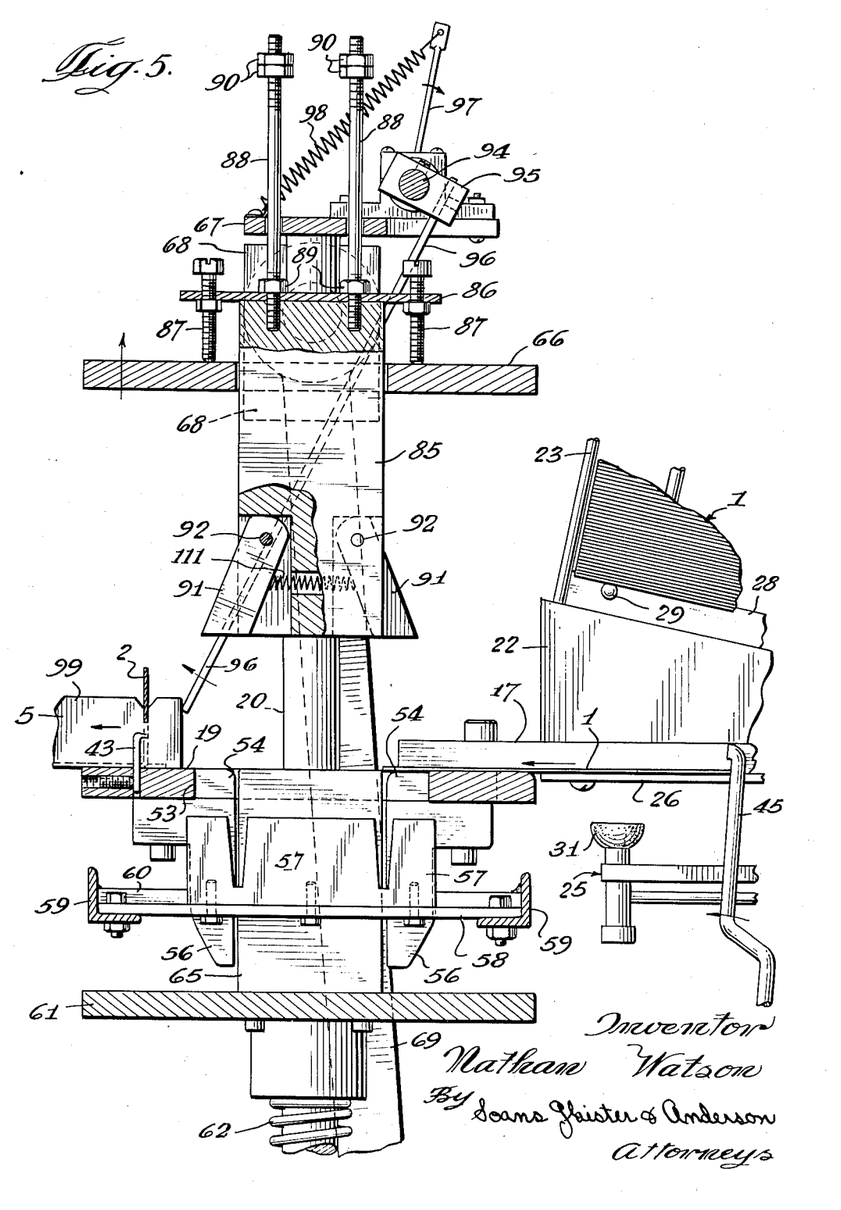
Figure 5 is a vertical section on the line 5—5 of Figure 3 but on an enlarged scale and showing certain parts in a changed position.
Figure 6:
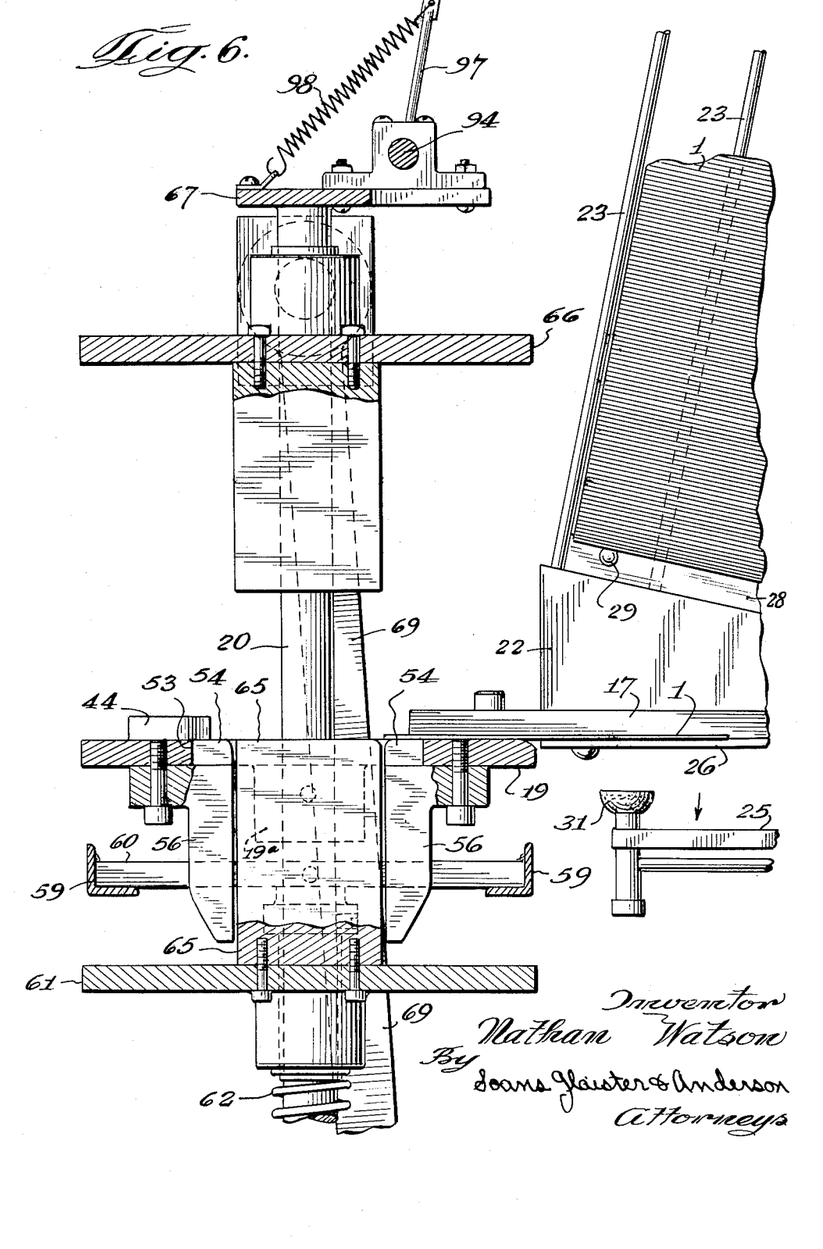
Figure 6 is a section on the line 6—6 of Figure 3 on an enlarged scale and showing the parts in a changed position corresponding to the position of the parts in Figure 5.

An operating cycle of the apparatus, together with some of the operating connections is as follows:

Referring first to Figure 1, it will be seen that from the position of the crank 70 and its counterclockwise direction of rotation, that the vertically movable upper plate 66 is approaching its upper limit of movement but has not yet reached it. The upper end of the bracket 68 will engage the arm 93 to actuate the ejector arms 96 as just explained. The blank picker 25 will move slightly downwardly from the position in which it is shown in Figure 1 to a position such as represented in Figure 5. The blank feeder arm 45 is in the first portion of its forward or blank feeding movement. This movement is effected by a link 101 (Figure 1) connected at one end to the adjacent connecting rod 69 and at its other end to one end of an arm 102 the other end of which is secured to the rock shaft 47. The pivot connection between the link 101 and the connecting rod 69 travels in a vertically elongated oval path of travel such as indicated at T, due to the vertical reciprocation and horizontal shifting components of movement of the connecting rod 69. During about the last half of the upward movement of the member 66 and the first half of the downward movement thereof, the feed fingers 45 are advanced to feed a blank into position over the die plate 19. During about the last half of the downward movement of the member 66 and the first half of the upward movement thereof, said fingers are retracted to starting position approximately as represented in Figure 1.

In the position of the mechanism shown in Figure 1, the vacuum cups 31 of the blank picker structure 25 are about to deposit a blank on the ledges 26 and 27. Vacuum was produced by the action of the pump 35 incident to upward movement of its piston rod 103, the upper end of which is connected as indicated at 104 to an arm 105 which is of angle form and which has one end pivotally connected as indicated at 106 to the pivot connection between the upper end of the adjacent connecting rod 69 and the bracket 68 of the upper vertically slidable plate 66. The other end of said arm 105 is pivotally connected as shown at 107 to an arm 108 which is secured to said picker rock shaft 24. Said picker rock shaft 24 carries a cam arm 109 which is adapted to engage a suitable boss 110 on the valve plate 39 (Figures 1 and 2), thereby to rock said plate against the pressure of the spring 41 and to lift the stopper 42 from the vent opening 38. Engagement between the cam arm 109 and boss 110 occurs only during a terminal portion of the upward movement of the pivot 106 and is timed to release the vacuum when the tray blank 1 is deposited on the guide ledges 26 and 27. This vacuum release occurs while the pump 35 is still being caused to produce suction in the hose line 34, the pump being, in effect, cut off from the vacuum picker cups. It will be apparent that during the upward movement of the vacuum picker arm 25, the valve plate 39 will be released by the cam 109 so that the spring 41 will be enabled to rock the plate to cause the stopper 42 to close said vent opening 38 whereby the pump 35 will again be made effective to establish suction in the pick-up cups 31. During the downward movement of the pump plunger, compressed air delivered into the hose 34 will escape through the vent opening 38 in the suction control valve.

The upper limit of movement of the member 66 and the parts carried thereby are represented in Figure 5 which may, therefore, be considered to show a step of advance from the position shown in Figure 1. In Figure 5 the ejector 96 has been rocked to effect ejection of the set up tray 99. As already mentioned the movement imparted to the ejectors 96 is a rather quick movement which serves to more or less kick the trays 99 out of the machine so that the tray shown at 99 will be understood to be under momentum which will carry it out of the apparatus even though it is no longer engaged by the arm 96. It will also be seen that in the position of the parts shown in Figure 5 the vacuum blank picker arm 25 is in its lowermost position fully disengaged and freed from the blank 1 which is being fed by the advancing feed arm 45 into position over the die plate 19.

A position of partial downward movement of the plate 66 is represented in Figure 8 and as there shown, the holding plungers 85 have reached a position in which their lower ends together with the lower ends of their spring pressed pawls on ears 91 are in engagement with the tray blank 1. These members 85 with their ears 91 rest on the areas of the blank which constitute the partition elements 4, 5 and 6 and the spring pressed pawls 91 project outwardly to bear on the end portions of said partition elements so that when the side wall members 2 and 3 are folded upwardly, said end portions of the partitions will be held against following said side wall portions upwardly. A spring 111 is interposed between opposite ears 91 to normally urge the same outwardly to the position shown in Figure 8. Said spring 111 is a very light spring since no great force is required to hold the ears outwardly and because it is desired that said ears be very easily moved inwardly incident to the upwardly folding of the side wall portions 2 and 3 of the tray as will presently appear. The plunger member 85 rests on the tray blank as an incident to the weight of the plungers, there being no other force to urge the members 85 downwardly. In the position of the parts shown in Figure 8, the lower ends of the folding or mandrel plungers 84 are slightly above the tray blank and in the starting relationship to the plungers 85 as shown in Figure 3. It will be observed that the stop nuts on the upper ends of the bolt rods 88 have not yet (in Figure 8) come into engagement with the upper cross member 67 but that but little further movement of the plunger members will be permitted. It will also be observed that the blank feed fingers 45 are in their fully advanced position with a blank 1 completely delivered into position over the die plate and against the stop finger 43. The vacuum blank picker is also shown in nearly its uppermost position about to engage the lowermost blank in the magazine preparatory to gripping the same and withdrawing it from the magazine. Before the blank is withdrawn from the magazine, the feed arms 45 will be returned to their starting position.

Figures 10, 11, 12, 13, 14, 15:
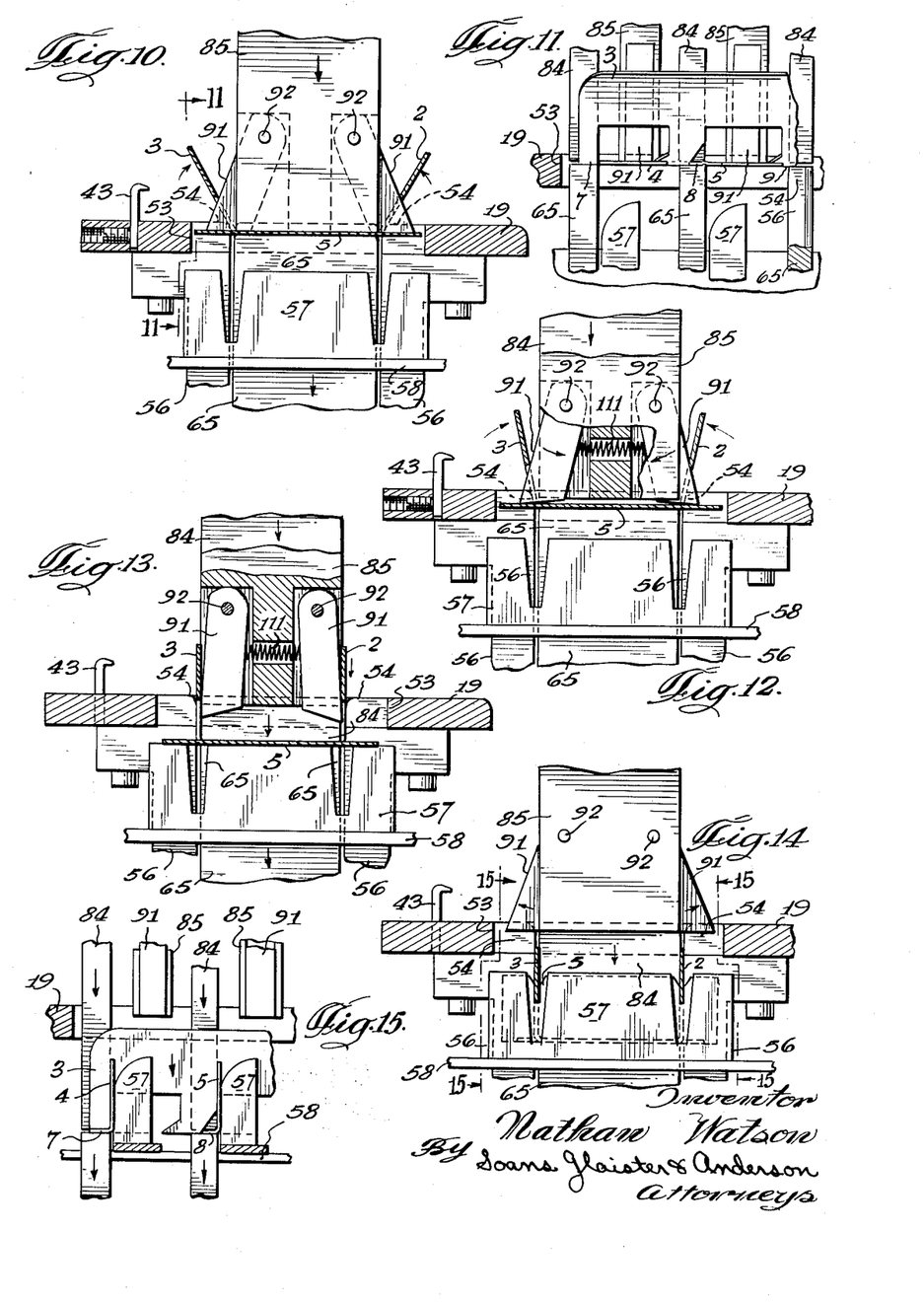
Figures 10, 12, 13, 14, 16, 18 and 19 constitute a series of views representing different positions of the parts and showing the method by which the blank is folded to form it into a tray.
Figure 11 is a sectional view on the line 11—11 of Figure 10.
Figure 15 is a sectional view on the line 15—15 of Figure 14.

In Figure 10 both plungers 84 and 85 are in engagement with the blank and the latter has been moved downwardly into the die plate opening sufficiently to have started the folding of the side wall portions 2 and 3 of the blank to an upwardly extending position. The function of the pawls 91 to hold the extremities of the transverse partition elements against upward folding with the side walls 2 and 3 is here more evident.

Figure 12 represents a slightly more lowered position of the plunger 84 than is shown in Figure 10, the blank 1 being represented as about half-way through the die plate. The finger bearing plunger 85 is in about the same position as in Figure 10 which represents its lowermost position and it will be seen that the pivoted pawls 91 are being forced inwardly incident to the engagement of the walls 2 and 3 of the blank with said pawls.

Figure 13 represents a further position of downward movement of the folding plungers 84, the pawl carrying plungers 85 being represented in their lowermost position with their pawls 91 fully retracted as an incident to the completed upward folding of the side wall panels 2 and 3 of the tray.

It may be observed that the bottom face of the tray blank is at all times from the beginning of its downward movement through the die, engaged by the upper ends of the upwardly facing plungers 65 and that these upwardly facing plungers cooperate with the downwardly facing mandrel plungers 84 to grip and hold the tray blank firmly between such plungers, thereby to keep the blank under control at all times.

Figure 14 represents the plunger 84 in its lowermost position of movement and the folding of the tray blank completed. During the downward movement of the plungers 84 from the position shown in Figure 13 to that shown in Figure 14, the transverse panel or partition elements 4, 5 and 6 of the blank are engaged by the upwardly facing male die members 57 which, being stationary, cause said transverse partition elements to be folded upwardly as an incident to the downward movement of the blank. The male die members 57 are vertically slotted as shown at 112 to receive the side wall elements 2 and 3 of the tray as clearly shown in Figure 14. The folding action of the upwardly projecting die members 57 is further represented in Figure 15.

Figures 16, 17, 18, 19:
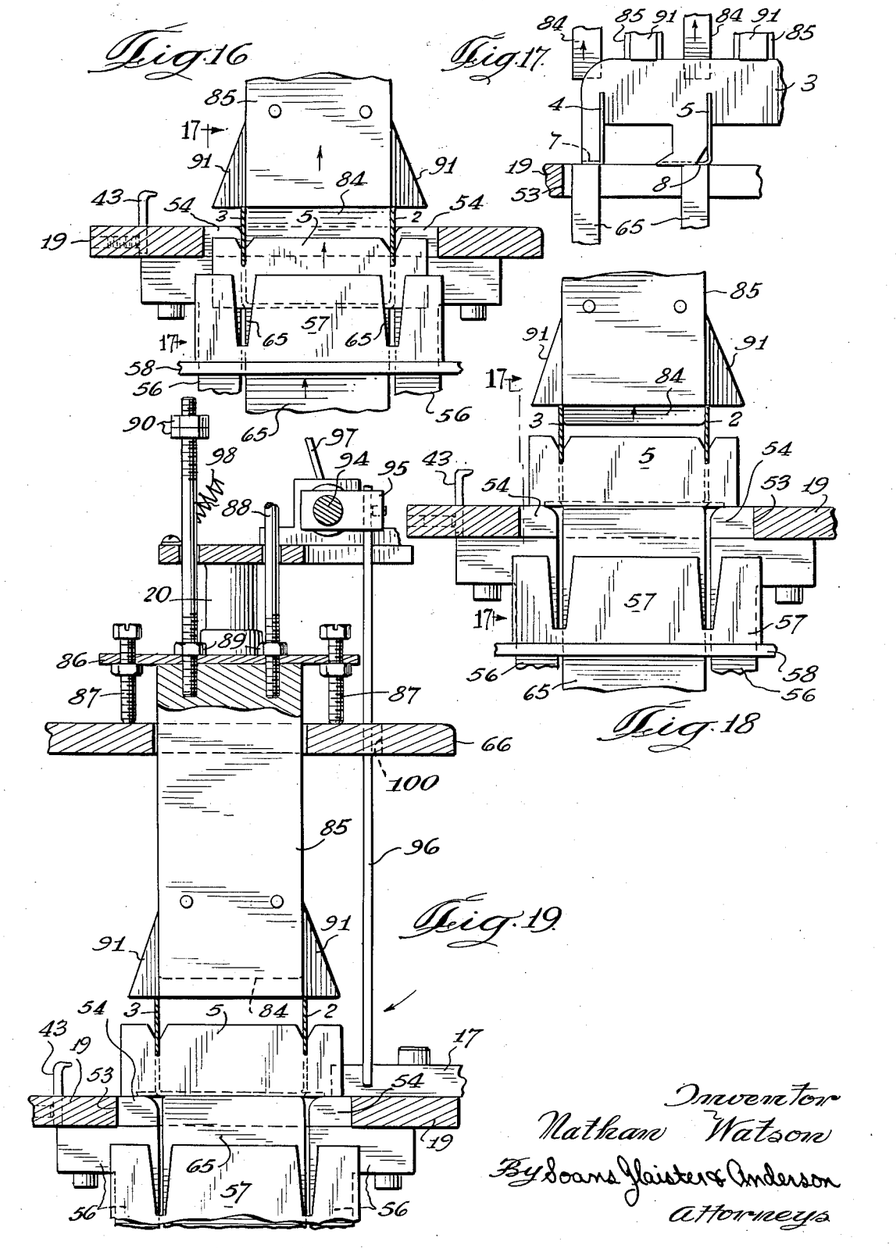
Figure 17 is a sectional view on the line 17—17 of Figure 18.

Figure 16 represents a position in the upward or return movement of the plungers 65, 84 and 85. The plungers 85 are now disposed above the upper edges of the side walls 2 and 3 and the pawls 91 are again projected outwardly into overlying relation to said side walls 2 and 3. This outward projection of the pawls 91 is permitted to occur due to the pressure of the spring 11, when the parts are in the position shown in Figure 14 wherein the folded tray structure is separated downwardly from the lower end of the pawl carrying plunger 85. The plunger in Figure 16 is represented in the course of upward movement as an incident to this engagement of the upper edges of the tray walls 2 and 3 with said pawls 91. The plunger 84 is as yet in engagement with the bottom of the tray, the underside of said bottom being engaged by the upper end of the upwardly moving plunger 65.

In Figure 18 the plunger 84 is continuing is upward movement and is about to be withdrawn from between the tray sides 2 and 3 while the tray is held down by said pawls 91. The plungers 65 have reached their upper limit of movement as determined by the collars 64 (Figure 7) so that the tray is no longer moved upwardly to lift the pawl carrying plungers 85.

In Figure 19, the plunger 84 is shown completely withdrawn from the tray, and the upwardly moving plate 66 has come into engagement with the abutment screws 87 so that further upward movement of the plate will move both the plungers 84 and the pawl carrying plungers 85 upwardly to free the tray for ejection by the ejector fingers 96 which are next actuated as shown in Figures 1 and 5. This completes one cycle of the tray forming operation.

It may be observed that in the described apparatus the tray blank is forced downwardly through the die plate and into engagement with the normally stationary upwardly projecting male dies 57 and that the tray which is thereby formed is then returned upwardly through the die plate opening to be discharged from the machine at the same level that the blanks 1 are delivered into position over the die plate. Incident to the formation of the tray, openings are formed in the sides 2 and 3 which permit the tray to be discharged over the stop pin 43 which is fixed in position to stop the feed movement of the incoming blanks 1.

The die plate 19 with its folding fingers 54 and the upwardly facing male die elements 57 together constitute a fixed die structure, these parts being normally stationary and in fixed relation to each other. The arrangement of folding elements in this die structure may of course be made to suit any given form of tray and in some instances, especially where a very narrow tray is to be formed, the central portions 57a (Figure 20) of the upwardly projecting male die may be omitted and the end portions 57b of the same depended on to effect upward folding of the transverse partition elements 4, 5 and 6. The disclosed arrangement is, however, advantageous where relatively wide trays such as illustrated in Figure 23, are to be set up. When employing the male die structure 57 as herein disclosed, it is necessary to disengage the formed up tray from the die structure by upward movement of the tray and this is preferably effected in the manner explained to position the tray on top of the die plate for ejection from the apparatus also as already explained. However, in some instances, especially when the intermediate male die elements 57a may be omitted, the trays may be stripped in the lowermost position reached thereby, from the mandrel plungers as an incident to the retracting or upward movement thereof, leaving the tray to drop below the die to a suitable chute or conveyor which may carry the formed trays from the apparatus.

The described apparatus is wholly self-contained in that it includes its own source or mode of driving power, its own source of vacuum for withdrawing blanks from the magazine and the machine operates continuously with no more attention from an operator than to maintain the magazine supplied with blanks. The apparatus is also compact in that it occupies floor space of approximately 36 inches by 30 inches and is approximately five feet high from the floor to its highest point. Hence, the machine is small enough to be classed as a portable machine capable of being readily moved from one location to another to supply set up trays to various locations where they are used. The machine operates at high speed and is capable of producing the trays much faster than is required to meet the demands for packaging the cookies or similar products produced by several simultaneously operating conventional cookie making machines of the continuous operating type.

Many changes in the described construction may be made without departing from the principles of the machine as above described.

I claim:

1. In apparatus for converting a cut and scored blank into a tray having a pair of side walls folded upwardly toward each other from an intervening bottom portion, and a plurality of partition elements extending transversely of said side walls and all folded upwardly in the same direction from said bottom portion, said partition elements having end portions which project beyond said side walls and are cut out of the same; the apparatus comprising a die structure having a plurality of laterally spaced pairs of transversely separated, relatively fixed folding fingers which have mutually opposed faces shaped to fold said side wall portions of the blank to upright wall position relative to said bottom portion, and a plurality of relatively fixed folding elements in fixed relation to said folding fingers and provided with folding surfaces disposed transversely of the folding surfaces of said fingers and all facing in the same direction, said folding elements being located to engage the projecting end portions of the said partition elements of the blank to fold said partition elements to upright partition position, means for forcing the blank through said die structure in predetermined relation to said folding fingers and elements, a plurality of holding plungers, ears pivoted on said holding plungers respectively adjacent the opposite sides and the lower ends thereof, and means normally urging said ears outwardly from the side edges of said holding plungers, said holding plungers having recesses for receiving said ears to permit the same to be compressed into the plungers and being engageable with the partition-forming portions of the blank intermediate said side-wall-forming portions, said ears being engageable with end portions of said partition-forming portions to prevent upward bending of said end portions as an incident to upward folding of said side wall portions and being movable into said recesses to facilitate withdrawal of said holding plungers and ears from between said upright side walls.

2. In apparatus for converting a cut and scored blank into a tray having a pair of side walls folded upwardly toward each other from a plurality of spaced, transversely extending bottom portions, and a plurality of partition elements extending transversely of said side walls and all folded upwardly in the same direction respectively from said bottom portions, said partition elements having end portions which project beyond said side walls and are cut out of the same; the apparatus comprising a die structure having a plurality of laterally spaced pairs of transversely separated, relatively fixed folding fingers which have mutually opposed faces shaped to fold said side wall portions of the blank upwardly toward each other to upright wall position, and a plurality of relatively fixed folding elements in fixed relation to said folding fingers and provided with folding surfaces disposed transversely of the folding surfaces of said fingers and all facing in the same direction, said folding elements being located to engage the projecting end portions of the said partition elements of the blank to fold said partition elements to upright partition position, a plurality of rigidly interconnected, mutually spaced mandrel plungers engageable respectively with the spaced bottom-forming portions of the blank and movable through said die structure for forcing the blank through the same in pre-determined relation to said folding fingers and elements, means for reciprocating said mandrel plungers into and out of said die structure whereby the blank is folded into tray form about said mandrel plungers, and holding plungers located intermediate said mandrel plungers and having ears pivoted thereon respectively adjacent the lower ends of the opposite sides thereof, said holding plungers having recesses for receiving said ears to permit the same to be compressed into said holding plungers, the latter being engageable with the partition-forming portions of the blank intermediate said side-wall-forming portions and said ears being engageable with end portions of said partition-forming portions to prevent upward bending of said end portions as an incident to upward folding of said side wall portions, said ears being movable into said recesses to facilitate withdrawal of said holding plungers and ears from between said upright side walls, said ears being adapted to be projected from said holding plungers into overlying relation to the side wall portions of the tray to strip the latter from said mandrel plungers, there being provided means for effecting movement of said mandrel plungers relative to said holding plungers during the withdrawal of the mandrel plungers from said die structure.

3. Apparatus of the class described comprising a die structure, vertically reciprocable plunger mechanism for forcing blanks through said die structure, said plunger mechanism embodying a plurality of transversely aligned, alternately arranged mandrel plungers and holding plungers, a reciprocably mounted plate from which said mandrel plungers depend and to which plate said mandrel plungers are fixedly attached, said plate being provided with openings slidably receiving said holding plungers, cross arms extending laterally from said holding plungers above said plate and provided with adjustable means depending into engagement with said plate for supporting said holding plungers from said plate for vertical movement relative to said mandrel plungers, guide rods extending upwardly from said holding plungers, stationary means provided with guide openings slidably receiving said guide rods to cooperate with said openings in said plate to maintain said holding plungers in parallel relation to said mandrel plungers, stop means on said guide rods for engaging said stationary means to limit downward movement of said holding plungers, and means effecting reciprocation of said plunger mechanism relative to said die structure.

4. Apparatus according to claim 3 wherein there is provided a plurality of upwardly facing members respectively aligned with the mandrel plungers and mounted for vertical reciprocation, and means biasing said upwardly facing members upwardly into cooperative relation to said mandrel plungers for gripping portions of said tray blank during the movement of the latter through said die structure.

5. Apparatus of the class described comprising a die structure, vertically reciprocable plunger mechanism for forcing blanks through said die structure, a rotatably driven crank arm, a connecting rod secured at one end to said crank arm and at its other end to said plunger mechanism for reciprocating the latter as an incident to rotation of said crank, a pivotally mounted feed arm for feeding tray blanks to said die structure, and a link interconnecting said feed arm and a portion of said connecting rod intermediate the ends of the latter so as to effect rocking of said feed arm as an incident to vertical and horizontal components of movement of said connecting rod at the connection of said link to said connecting rod.

6. Apparatus of the class described comprising a die structure for folding tray blanks, vertically reciprocable plunger mechanism for forcing foldable tray blanks through said die structure, means for effecting reciprocation of said plunger mechanism, a magazine for a supply of tray blanks to be folded, a rock shaft, a vacuum blank picker mounted on said rock shaft for successively withdrawing tray blanks from said magazine and operative to deposit the said blanks successively in position for delivery to said die structure, an arm secured to and projecting from said rock shaft, a link interconnecting said arm and said reciprocating plunger mechanism so as to effect rocking of said picker in synchronized relation to the reciprocation of said plunger mechanism, a valve structure for controlling the establishment of suction in said picker, and means carried by said rock shaft for actuating said valve structure.

7. In apparatus for converting a cut and scored blank into a tray having a pair of side walls folded upwardly toward each other from an intervening bottom wall, and a plurality of partition elements extending transversely of said side walls and folded upwardly from spaced portions of said bottom wall intermediate said side walls, said partition elements having end portions which project beyond said side walls and are cut out of the same; the apparatus comprising a die structure having two sets of mutually opposed, fixed folding fingers, said sets of fingers extending toward each other from mutually opposed portions of the structure and terminating in spaced relation to each other, said folding fingers having surfaces shaped to engage and fold the side wall forming portions of the blank upwardly upon movement of the blank past said sets of fingers, the fingers of each set being spaced from each other so as to be engageable with spaced portions of said side walls, said die structure also having two sets of folding members respectively associated with said sets of fingers, the folding members of each set thereof being respectively positioned adjacent the fingers of the associated set thereof for engaging partition forming portions of the blank outwardly of said side wall portions thereof, said folding members having surfaces shaped to engage and fold said partition elements upwardly from said bottom wall upon movement of the blank past said folding members; and means for effecting movement of a blank past said folding fingers and members.

8. In apparatus for converting a cut and scored blank into a tray having a pair of side walls folded upwardly toward each other from an intervening bottom wall, and a plurality of partition elements extending transversely of said side walls and folded upwardly from spaced portions of said bottom wall intermediate said side walls, said partition elements having end portions which project beyond said side walls and are cut out of the same; the apparatus comprising a die structure having two sets of mutually opposed, fixed folding fingers, said sets of fingers extending toward each other from mutually opposed portions of the structure and terminating in spaced relation to each other, said folding fingers having surfaces shaped to engage and fold the side wall forming portions of the blank upwardly upon movement of the blank past said sets of fingers, the fingers of each set being spaced from each other so as to be engageable with spaced portions of said side walls, said die structure also having a set of folding members respectively positioned to engage partition forming elements of the blank intermediate said side walls, said folding members having surfaces shaped to engage and fold said partition elements upwardly from said bottom wall upon movement of the blank past said folding members; and means for effecting movement of a blank past said folding fingers and members.

9. In apparatus for converting a cut and scored blank into a tray having a pair of side walls folded upwardly toward each other from an intervening bottom wall, and a plurality of partition elements extending transversely of said side walls and folded upwardly from spaced portions of said bottom wall intermediate said side walls, said partition elements having end portions which project beyond said side walls and are cut out of the same; the apparatus comprising a die structure having two sets of mutually opposed, fixed folding fingers, said sets of fingers extending toward each other from mutually opposed portions of the structure and terminating in spaced relation to each other, said folding fingers having surfaces shaped to engage and fold the side wall forming portions of the blank upwardly upon movement of the blank past said sets of fingers, the fingers of each set being spaced from each other so as to be engageable with spaced portions of said side walls, said die structure also having two sets of folding members respectively associated with said sets of fingers and another set of folding members which are respectively aligned with and intermediate mutually opposed members of said sets of folding members, said intermediate folding members being spaced from said mutually opposed members so as to provide space for receiving the side walls folded upwardly by said folding fingers, the mutually opposed folding members of said two sets being respectively positioned adjacent the fingers of the associated set thereof for engaging partition forming portions of the blank outwardly of said side wall portions thereof and said intermediate folding members being positioned to engage and fold partition portions intermediate said side wall portions, said folding members having surfaces shaped to engage and fold said partition elements upwardly from said bottom wall upon movement of the blank past said folding members; and means for effecting movement of a blank past said folding fingers and members.

10. In apparatus for converting a cut and scored blank into a tray having a pair of side walls folded upwardly toward each other from an intervening bottom wall, and a plurality of partition elements extending transversely of said side walls and folded upwardly from spaced portions of said bottom wall intermediate said side walls, said partition elements having end portions which project beyond said side walls and are cut out of the same; the apparatus comprising a die structure having two sets of mutually opposed, fixed folding fingers, said sets of fingers extending toward each other from mutully opposed portions of the structure and terminating in spaced relation to each other, said folding fingers having surfaces shaped to engage and folding the side wall forming portions of the blank upwardly upon movement of the blank past said sets of fingers, the fingers of each set being spaced from each other so as to be engageable with spaced portions of said side walls, said die structure also having two sets of folding members respectively associated with said sets of fingers, the folding members of each set thereof being respectively positioned adjacent the fingers of the associated set thereof for engaging partition forming portions of the blank outwardly of said side wall portions thereof, said folding members having surfaces shaped to engage and fold said partition elements upwardly from said bottom wall upon movement of the blank past said folding members and said surfaces being recessed relative to said side wall folding surfaces of said fingers so as to initiate folding of said partition elements after folding of said side walls is well under way; and means for effecting movement of a blank past said folding fingers and members.

11. In apparatus for converting a cut and scored blank into a tray having a pair of side walls folded upwardly toward each other from an intervening bottom wall, and a plurality of partition elements extending transversely of said side walls and folded upwardly from spaced portions of said bottom wall intermediate said side walls, said partition elements having end portions which project beyond said side walls and are cut out of the same; the apparatus comprising a die structure having two sets of mutually opposed, fixed folding fingers, said sets of fingers extending toward each other from mutually opposed portions of the structure and terminating in spaced relation to each other, said folding fingers having surfaces shaped to engage and fold the side wall forming portions of the blank upwardly upon movement of the blank past said sets of fingers, the fingers of each set being spaced from each other so as to be engageable with spaced portions of said side walls, said die structure also having two sets of folding members respectively associated with said sets of fingers, the folding members of each set thereof being respectively positioned adjacent the fingers of the associated set thereof for engaging partition forming portions of the blank outwardly of said side wall portions thereof, said folding members having surfaces shaped to engage and fold said partition elements upwardly from said bottom wall upon movement of the blank past said folding members; and a movable mandrel for forcing the blank past said folding fingers and members, said mandrel comprising a plurality of spaced, rigidly interconnected bars respectively positioned to be engagable with said spaced bottom wall portions of the blank intermediate said side walls and so as to be movable through the spaces intermediate mutually opposed folding fingers.

References Cited in the file of this patent
UNITED STATES PATENTS

| | | |
|---|---|---|
| 519,671 | Gay | May 8, 1894 |
| 2,337,803 | Deline | Dec. 28, 1943 |
| 2,580,189 | Pagendarm | Dec. 25, 1951 |